US010958597B2

(12) United States Patent
Suresh et al.

(10) Patent No.: US 10,958,597 B2
(45) Date of Patent: Mar. 23, 2021

(54) GENERAL PURPOSE RING BUFFER HANDLING IN A NETWORK CONTROLLER

(71) Applicant: Cisco Technology, Inc., San Jose, CA (US)

(72) Inventors: Tanjore K Suresh, Fremont, CA (US); Ravikiran Kaidala Lakshman, San Jose, CA (US); Deepak Srinivas Mayya, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/284,900

(22) Filed: Feb. 25, 2019

(65) Prior Publication Data

US 2020/0274829 A1 Aug. 27, 2020

(51) Int. Cl.
*H04L 12/861* (2013.01)
*H04L 12/939* (2013.01)
*H04L 12/863* (2013.01)

(52) U.S. Cl.
CPC .......... *H04L 49/90* (2013.01); *H04L 47/6225* (2013.01); *H04L 49/555* (2013.01)

(58) Field of Classification Search
CPC .... G06F 13/28; G06F 13/1673; G06F 13/225; G06F 13/34; G06F 15/17331; G06F 15/7825
See application file for complete search history.

(56) References Cited

U.S. PATENT DOCUMENTS

| | | | |
|---|---|---|---|
| 5,299,313 A | 3/1994 | Petersen et al. | |
| 5,428,766 A * | 6/1995 | Seaman | G06F 11/0751 709/215 |
| 7,826,470 B1 | 11/2010 | Aloni et al. | |
| 7,937,499 B1 | 5/2011 | Tripathi | |
| 9,069,633 B2 | 6/2015 | Manula et al. | |
| 9,871,734 B2 * | 1/2018 | Kagan | H04L 69/321 |
| 9,996,484 B1 * | 6/2018 | Davis | G06F 13/105 |
| 10,437,523 B2 * | 10/2019 | Tsirkin | G06F 3/0673 |
| 10,454,991 B2 * | 10/2019 | Bloch | G06F 9/45558 |
| 10,481,937 B2 * | 11/2019 | Yu | G06F 9/45558 |
| 10,482,567 B2 * | 11/2019 | Lv | G06F 13/00 |
| 2006/0050722 A1 * | 3/2006 | Bury | H04L 49/90 370/403 |
| 2007/0239965 A1 * | 10/2007 | Lewites | G06F 9/544 712/13 |
| 2010/0131669 A1 * | 5/2010 | Srinivas | G06F 9/452 709/233 |

(Continued)

*Primary Examiner* — Parth Patel
*Assistant Examiner* — Berhanu D Belete
(74) *Attorney, Agent, or Firm* — Polsinelli PC

(57) ABSTRACT

The disclosed technology relates to a process for general-purpose ring buffer handling in a network controller. Specifically, general purpose ring buffers are used in software queue on both the host domain and the network controller to carry out user-defined protocols. The protocols define the relationship of the ring buffers in the host domain and the network controller domain (e.g. how data is moved and processed). The protocols minimize interruptions to the network controller. Furthermore, the implementation of ring buffers in the network controller domain also provides additional resources to the host domain for carrying out the user-defined protocols.

19 Claims, 10 Drawing Sheets

(56) References Cited

U.S. PATENT DOCUMENTS

| | | | |
|---|---|---|---|
| 2012/0260017 A1* | 10/2012 | Mine | G06F 9/544 |
| | | | 710/308 |
| 2013/0315237 A1* | 11/2013 | Kagan | H04L 29/00 |
| | | | 370/389 |
| 2014/0055464 A1* | 2/2014 | Srinivas | H04L 67/04 |
| | | | 345/502 |
| 2015/0271244 A1* | 9/2015 | Bloch | H04L 67/02 |
| | | | 709/217 |
| 2015/0281126 A1* | 10/2015 | Regula | H04L 67/26 |
| | | | 709/212 |
| 2016/0217104 A1* | 7/2016 | Kamble | G06F 9/50 |
| 2017/0069054 A1 | 3/2017 | Ramadoss et al. | |
| 2017/0249457 A1* | 8/2017 | Tsirkin | G06F 21/6227 |
| 2018/0011729 A1* | 1/2018 | Yu | G06F 9/4881 |
| 2018/0101494 A1* | 4/2018 | Davis | G06F 13/385 |
| 2018/0322088 A1* | 11/2018 | Kamble | H04L 67/1097 |
| 2018/0373556 A1* | 12/2018 | Tian | G06F 9/45558 |
| 2018/0373570 A1* | 12/2018 | Xu | G06F 9/5061 |
| 2018/0374188 A1* | 12/2018 | Lv | G06F 12/145 |
| 2019/0140983 A1* | 5/2019 | Tu | H04L 43/028 |
| 2019/0188148 A1* | 6/2019 | Dong | G06F 12/1009 |
| 2019/0220301 A1* | 7/2019 | Zheng | G06F 9/45558 |

\* cited by examiner

Ring Information Table (RIT)

| Field | Length in Bits | Description |
|---|---|---|
| Ring Buffer Base | 64 bits | Ring base address |
| Ring Size | 16 bits | 64k max number of descriptors though this can be customized based on application. |
| Descriptor size | 12 bits | Can choose from 16 bytes to 4K with expected 4 byte alignment. |
| Posted Index | 16 bits | The index in the ring buffer indicating the next free buffer where the next descriptor could be filled. |
| Fetch Index | 16 bits | Descriptor that hardware will attempt to move next. |
| Operational Status | 8 bits | Indicates if the particular ring buffer is enabled. If not, the hardware will not schedule this ring. |
| Error Status | 8 bits | Indicates an error happened. If this bit is enabled, any processes related to this queue will stop until recovery is performed. |
| Interrupt Enable | 8 bits | Bit 0 enables the interrupt when set |

FIG. 4A

Shadow Ring Information Table (SRIT)

| Field | Length in Bits | Description |
|---|---|---|
| Bus | 8 bits | Indicates that this software ring is owned by a particular PCI device identified by Bus #. |
| Device | 8 bits | 5 bits are used (3 are reserved). This indicates the device number which hosts this queue. |
| Function | 8 bits | 3 bits are used (5 are reserved). This hosts the software queue under question. |
| Shadow ring base | 64 bits | For base address of the shadow ring |
| Shadow ring size | 16 bits | Either same size or larger than corresponding ring in the host domain. Size can be software dependent, or depend on processing latency |
| Shadow Posted index | 16 bits | Indicates the posted index |
| Shadow fetch index | 16 bits | Indicates the fetch index |
| Direction of data move | 2 bits | 0 indicates local to host<br>1 indicates from host to local<br>2 local to local<br>3 reserved |
| Interrupt Enable | 8 bits | Bit 0 enables the interrupt when set. If not set the owner does not require interrupt. |
| Interrupt number | 16 bits | Indicates which interrupt needs to be generated when the operation is completed. |

FIG. 4B

Offset X in Bar Map

RIT #0 with respect to this PCI-E – Maps to Actual RIT for a Software Queue 'n' in the RIT Table of registers.

510

X+1 * RITSTRIDE

RIT #1 with respect to this Pci-E device – Maps to actual RIT for a sofwtare Queue 'm' in the RIT Table of registers.

520

X + 2* RITSTRIDE

RIT #2 with respect to this PCI-E device – Maps to actual RIT for a software queue 'p' in the RIT Table of registers.

530

X+ 3 * RITSTRIDE

RIT #3 with respect to this PCI-E device – Maps to actual RIT for a software queue 'q' in the RIT Table of registers.

GENERAL PURPOSE RING BUFFER HANDLING IN A NETWORK CONTROLLER

TECHNICAL FIELD

The subject matter of this disclosure relates in general to the field of network controllers, and more specifically for implementing general purpose ring buffer handling in network controllers.

BACKGROUND

Network controllers (also known as network interface cards, network adapters, LAN adaptors, or physical network interfaces) are computer hardware components that connect computing devices to a computer network. Network controllers implement electronic circuitry that is used by computing devices to communicate with specific physical layer and data link layer such as Ethernet or Wi-Fi.

Current network controllers implement various types of different ring buffers which each have their own semantics that are used to handle specific tasks. For example, a ring buffer may be set up to specifically perform only data transmissions between the network controller and the computer network. The use of specific ring buffers to handle specific tasks is inefficient because extra bits are needed to define the semantics associated with a specific ring buffer. Ring buffers, as currently defined, do not have a means to overload additional semantics. This prevents ring buffers from being generic enough to implement additional features or protocols on existing network controllers.

Furthermore, current network controllers require additional requirements to process data positioned on the PCI-host in order to implement new features or protocols. In addition, when data needs to be moved between the PCI-host and the network controller device for processing, CPU cycles of the network controller are being wasted in order to carry out the moving of the data. Specifically, the network controllers need to freeze the credit flow on PCI-E bus in order to minimize the need to order/re-order the data being moved. Such freezing of the PCI-E bus impacts the efficiency of the network controller as it interrupts other applications being performed on the network controller. Therefore, there is also a need to implement a process that minimizes the interruptions to the network controller caused by the movement of data between the network controller and the PCI-E bus.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which:

FIG. 4A and FIG. 4B illustrate tables listing parameters of the generic ring buffer and shadow ring buffers in accordance with various embodiments of the subject technology;

FIG. 5 is a conceptual block diagram illustrating the process of reading and writing within an example ring buffer in accordance with various embodiments of the subject technology;

BRIEF DESCRIPTION OF EXAMPLE EMBODIMENTS

Figure 1:
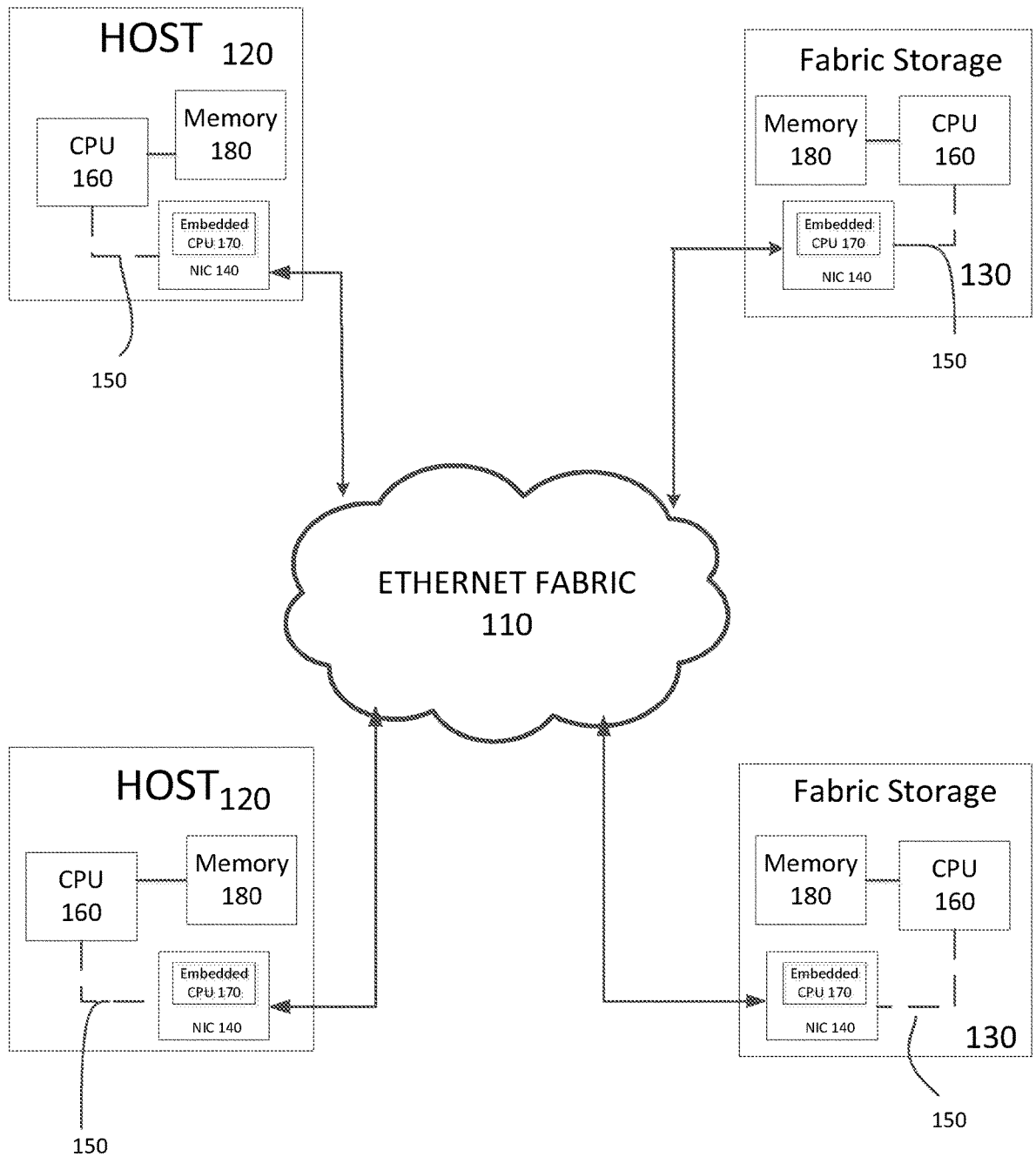
FIG. 1 is a conceptual block diagram illustrating an example network environment in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed herein are computer-implemented methods, computer-readable media, and systems for transmitting data between a host domain and a network controller domain using software queues. The software queues comprise of a first plurality of ring buffers on the host domain and a second plurality of ring buffers on the network controller domain. The second plurality of ring buffers corresponds to the first plurality of ring buffers. A protocol is executed using the software queues. The protocol defines a relationship between the plurality of software queues pertaining to how data is transmitted and processed to carry out the executed protocol. Once the requested operation is complete, the network controller can be interrupted and instructed to move an agreed upon formatted data from the network controller back to the host.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As described herein, the present description provides details regarding implementation of general purpose ring buffer handling in a network controller. Specifically, software queue pairs (implemented using generic ring buffers) are set up and configured on the network controller. The software queue pairs (which correspond to the ring buffers on both the host domain and the network controller domain) work together to facilitate the movement of data between the network controller domain and the host domain, which is accessed by using the PCI associated with the network controller. The software queues are used in connection with user-defined protocols. Each user-defined protocol is a set of rules that governs the exchange or transmission of data between devices. In this case, the protocol defines the relationship between the software queues pertaining to data movement between a host domain and a network controller domain or vice versa. The user-defined protocol provides information regarding, for example, the direction of data movement between domains and also between the software queues, the type of data that is expected, where the data should be moved to, processing that needs to be completed, and what results are expected from the processing.

A mapping corresponds to each protocol. The mapping is an agreement within an application pertaining to how the software queues are configured, how they are used, and how they interact with each other. The mapping can be programmed into memory explicitly or be included in the configuration of the software queues implicitly. In this way, the roles of the software queue are established before a protocol is executed so that when the protocol is executed, each software queue knows what type of data it is expecting to receive and what the software queue will need to do to the data (e.g. monitor for data being posted, where to transmit data, inform the hardware to process the data). This minimizes the need for the processor (e.g. the network controller embedded CPU) to become involved during the movement of the data between the host domain and the network controller domain until the protocol is complete.

The benefits of implementing generic ring buffer handling in the network controllers will not only save a lot of computing resources needed to move data (associated with previous CPU cycles of reading and identifying the specific roles of the software queues as well as programming registers needed for the data movement), but also minimize the interruptions to the network controller (associated with freezing the PCI-E flow control credits to maintain an order of operations) thereby improving the efficiency of the network controller.

FIG. 1 is a conceptual block diagram illustrating an example network environment 100 in accordance with various embodiments of the subject technology. Various embodiments using the generic ring buffer handling of network controllers (referenced in the figure as NIC) are discussed with respect to the example network environment 100 that is in communication with a network 110 (e.g. Ethernet). As illustrated in the figure, each of the computing devices wanting to connect to the network 110 will have both the features of network controllers 140 and peripheral component interface (PCI) 150 if they want to connect to the network 110. For example, FIG. 1 illustrates a number of different host computing devices 120 and fabric storage devices 130. Although not illustrated, more of those same devices as well as other devices can also be implemented in the same network environment 100. The generic ring buffer handling will be implemented in each of the network controllers 140 of the different computing devices.

In connection with each computing device, the generic ring buffer handling facilitates the movement of data between the network controllers 140 and Host Environment (CPU) via the PCI 150. Network controllers provide application program interfaces (API) that allow the computing device to communicate with the network. Meanwhile, the PCI 150 is an interconnection system that facilitates connecting hardware components (in this case the network controller 140) in the computing devices. Therefore, any interruptions to the PCI 150 (such as controlling the flow of data to allow the processor to set up registers for the movement of data) will influence the efficiency of associated network controllers 140, even if other protocols being run on the network controller 140 do not require use of the PCI.

The implementation of generic ring buffer handling minimizes the interruptions to the network controller 140 by the processor (CPU) 160 since the embedded processor 170 could be used for other processing of protocols instead being used to facilitate movement of data (e.g. setting up registers for data movement) between the network controller domain and the host domain. The generic ring buffers will be used in connection with different user-defined protocols that are used to instruct the movement and processing of data on both the network controller 140 and the PCI 150 thereby minimizing involvement by the Embedded CPU 170 to initiate and facilitate data movement. These generic ring buffers can be stored/hosted, for example, in memory 180. The details regarding how the implementation of generic ring buffer handling and the benefits associated with the use of the generic ring buffer handling will be provided in further detail below.

Figure 2:
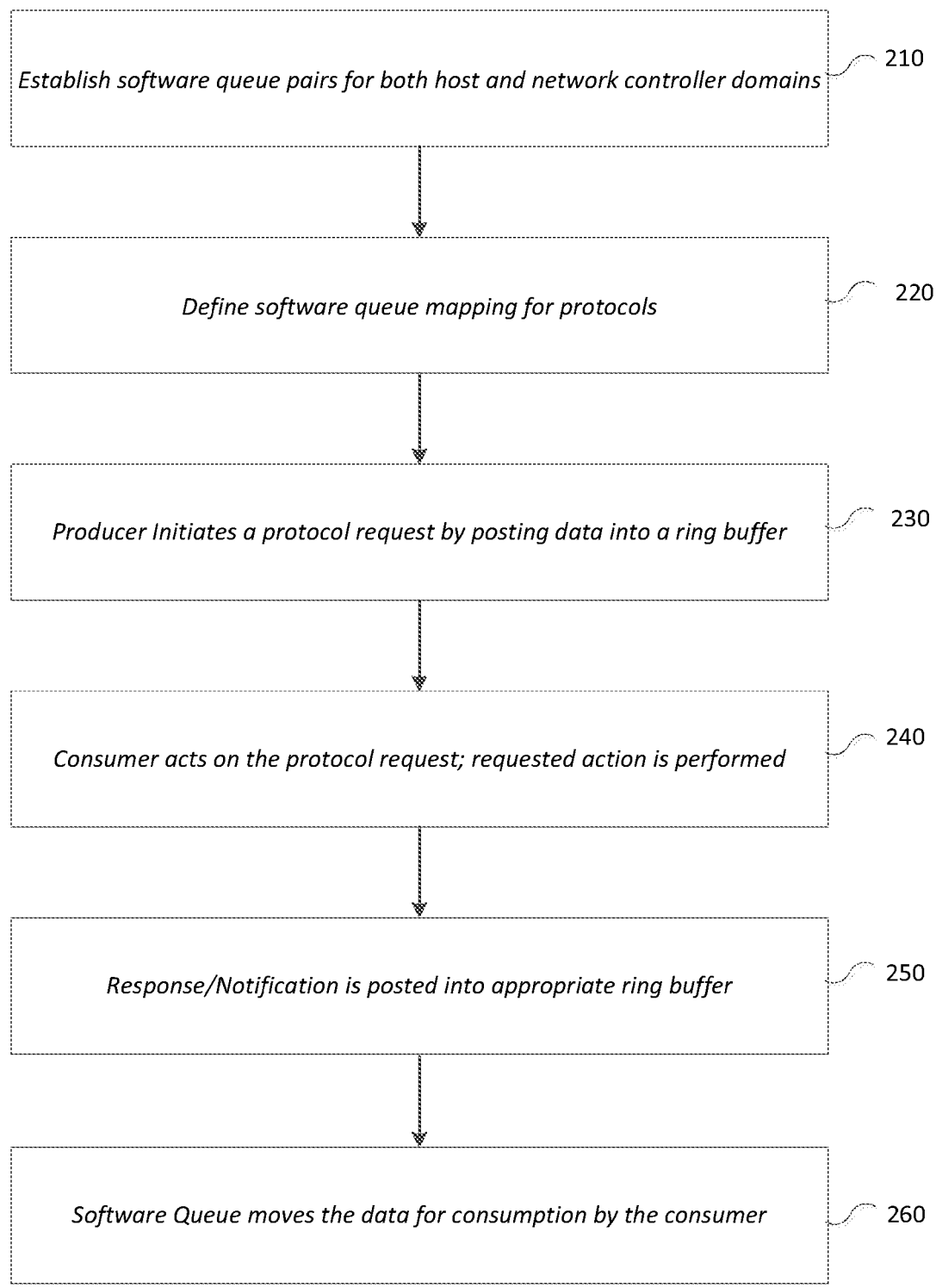
FIG. 2 shows an example process for implementing general purpose ring buffer handling in the network controller in accordance with various embodiments of the subject technology.

FIG. 2 shows an example process 200 for implementing general purpose ring buffer handling in the network controller. Specifically, the implementation of general purpose ring buffers handling in connection with the network controller provides at least two improvements over use of conventional ring buffer technology with network controllers. The first improvement is that the generic purpose ring buffers allow for a more efficient process for moving data between the network controller domain and the host domain and vice versa on the network controller. The efficiency arises because the general-purpose ring buffers implemented in the software queue are not tied to specific semantics that would 1) allow the software queues to be used for implementing a variety of different protocols or applications and 2) minimize the need for the processor to be involved during the movement of data. Instead of having the embedded processor initiate the descriptor information read, the configuration registers provide the information required to understand the amount of data movement and where the data need to be moved next, and when the data movement should start.

The role of each software queue is decided by the application being implemented. For example, each software queue has a producer (e.g. a first software entity) and a consumer (e.g. a second software entity). The producer can produce data agreed upon with the consumer for movement from one domain to another. The consumer is another entity that uses the produced data, understands the data, and takes action using that data. This agreement of semantics between producers and consumers are different for different software queues and are different for different applications.

The mapping between different software queues, number of software queues required, and how the software queues are used are decided by the implementer of the application. An example application could choose a first software queue to move data from the host domain to the network controller domain and a second software queue to move data from the network controller domain to the host domain. The semantics of the data produced, which the consumer acts on, is hereinafter referred to as a protocol. Such protocols are decided upon and defined, for example, by the application developer. The mapping for the user-defined protocol instructs the producer to send an appropriate type of data on the software queue and the consumer to expect the appropriate type of data at the other end. Based on the semantics agreed upon, the consumer initiates the expected actions and waits for that action to complete before the results are sent to the requestor of the action via another software queue. There may also be agreed situations between the producer and consumer to not inform results of an action performed.

The second improvement pertains to the ability of the host domain to take advantage of a larger number of software queues that can be set up and configured on the network controller domain. There are certain PCI-E resources, for example Message Signaled Interrupt (MSI), that may limit the numbers of software queues that can be configured on a specific host system running specific Operating System environment co-existing with other PCI-E devices on a system. The second improvement provides the host domain more resources to carry out the data movement and processes associated with different protocols.

Initially the host domain and the network controller domain will set up and configure a number of software queue pairs that would be used to move data between the host domain and the network controller domain (in step 210). This set up and configuration step for the software queue pairs may include defining where the software queues would be located in memory on the network controller domain and the host domain as well as parameters related to each of the ring buffers of the software queue pairs. Example parameters that may need to be established in setting up the ring buffers and shadow ring buffers of the software queue pairs are illustrated in FIG. 4A and FIG. 4B in connection with the ring information table (RIT) for the ring buffers on the host domain and the shadow ring information table (SRIT) for the ring buffers on the network controller domain.

Because generic ring buffers are being used in connection with the software queues in both the host domain and network controller domain, an application specific mapping is used to define the roles for the software queues in connection with different protocols (in step 220). The mapping, which is stored in memory and understood by the producer and consumer software entity, allows to the software entity to understand what type of data it should be looking for, what action will it do with the data once it receives it, and where to send the results of the action if necessary (e.g. to the next software queue). The information provided in RIT/SRIT table and the relationship between the software queues is defined in this manner and known, the processor is not needed to initiate the movement of the data between the generic ring buffers configured on the network controller and host domain via the PCI. This minimizes the interruptions to the network controller as the embedded CPU (170) would typically need to be interrupted to indicate data availability for initiating data movement. Such interruption could possibly stall all other processes on the PCI-E to maintain order. Now, with the general purpose ring buffers and the mapping, the processor only needs to be notified when protocol data is available. In this way, the processor can spend its cycles only on the action to be performed as understood from the data received rather than spending cycles to move the data from domain to domain or if any issues arise (e.g. errors) related to the data movement during an executed protocol.

A protocol is initiated by the producer, in step 230, with the posting of the appropriate type of data into a first software queue within a domain associated with the application (in this embodiment that happens to be host domain). The consumer of the first software queue, as defined within the mapping, may be monitoring for a specific data type. When the appropriate data type is posted for the first software queue, the first software queue can initiate moving of the posted data to the corresponding shadow ring buffer configured.

The application may involve the use of multiple software queues that each monitor for a specific type of data, instruct the hardware to perform some type of processing on that data after receiving it, or computationally perform the requested action and afterwards provide the processed data and the results of the processing to the next software queue according to the mapping used by that application (which in turn is monitoring for the specific type of data).

For example, data may initially be produced to a first software queue within the host domain. The consumer of the first software queue, upon recognizing that the data is the specific data type it is looking for will then proceed, process the data, carry out the requested action, and move the resultant data and action status to the next software queue within the network controller domain according to the mapping. Once the data is in the network controller domain, the data can be passed between other software queues according to the mapping stipulated by the application. The consumer can also instruct the hardware to perform any necessary processing of the data set according to the protocol or may be responsible for instructing the hardware to perform some part of the processing required for the protocol (in step 240). With one or many intermediary transfer of data and processing, a consumer could receive the data from a previous software queue, check that the received data corresponds to the type it is supposed to receive, instruct the hardware to perform its assigned processing of the data, and provide the processed data to the next software queue. The cycle of moving and processing the data is repeated across as many software queues as the mapping defines as needed to implement the application.

Once the action requested by protocol data is complete (e.g. all the necessary processing has been performed on the data within the network controller domain), the consumer (in this embodiment, it could be a software entity running on the CPU) can be notified accordingly (in step 250). This notification (a set of data posted into appropriate ring buffer for transfer to its destination ring buffer) is intended to inform the requestor of the protocol action has been completed and that the processed data is ready to be sent to the host domain from the network controller domain.

After being notified that the posted data has been processed and the results from the processing is available, the software queue then begins moving the processed data back from the network controller domain to the host domain (in step 260). The software queue implementation can optionally interrupt the CPU based on the configuration setup of the software queues by the application. This then allows the host domain to receive the processed data and subsequently use the processed data once the protocol has been completed.

Figure 3:
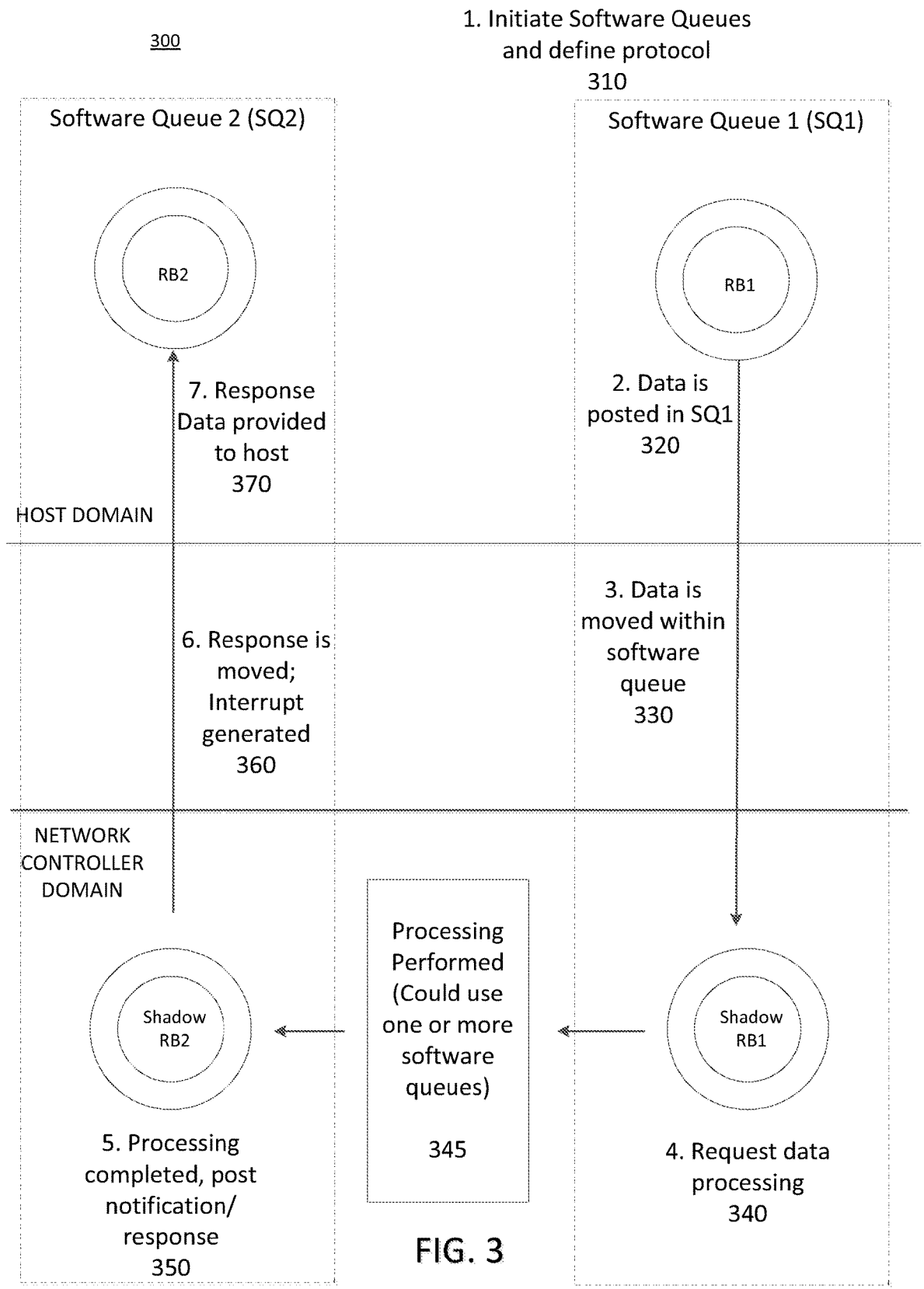
FIG. 3 is an illustration depicting how an example protocol is executed using software queues in accordance with various embodiments of the subject technology.

As described above, users are able to define any number of different protocols to be executed using the software queues on both the host domain and the network controller domain. For example, an example protocol may pertain to calculating a checksum for a block of data for the purposes of detecting errors that may have been introduced during the transmission or storage of data. FIG. 3 is an illustration 300 depicting how the example protocol is executed using software queues according to the process described in FIG. 2.

Before the checksum calculation can be performed on the block of data, the software queues on both the host domain and the network controller domain would need to be initiated (in step 310). The initiation of the software queues on the host domain and the network controller domain would set up and configure the software queues for use in moving the data between the two domains. The protocol for performing the checksum can then be defined. The defined protocol would identify which software queues on both the host domain and the network controller domain will be used to move the data between the two domains as well as within the network controller domain which entity will be instructing the hardware of the network controller to perform calculations needed to obtain the checksum output. In this embodiment application, the ring buffer 1 (RB1) and associated shadow ring buffer (shadow RB1) can be referred to collectively as software queue 1 (SQ1). The software queue 1 (SQ1) is used for data movement from the host domain to the network controller domain. The consumer entity is responsible for receiving data from the software queue 1 (SQ1), process the received data, and initiate the necessary actions to compute the checksum on the received data. The consumer entity is also responsible for initiating the response for the host domain via software queue 2 (SQ2). The protocol that is used to define how the data is moved and processed using software queue 1 (SQ1) and software queue 2 (SQ2) as described above can be stored in memory referenced at a later time when this same protocol needs to be executed.

In step 320, the block of data that will be operated on using the protocol for calculating the checksum will be posted in a first software queue (SQ1). In particular, the data will be posted to the ring buffer 1 (RB1) within the host domain.

The software queue implementation then monitors the posted index for ring buffer 1. Once detected by the change in posted index, the software queue proceeds to move the block of data from the ring buffer 1 (RB1) to its associated shadow ring buffer 1 (Shadow RB1) in step 330. The associated ring buffer 1 is a ring buffer within the network controller domain. The data is moved between the host domain and the network controller domain without using the processor. By minimizing the need to use the processor to move data between ring buffers of the host domain and the network controller domain, the present application provides a greater efficiency for the network controller as there are fewer interruptions affecting the workflow on the network controller.

The next software queue (e.g., software queue 2) where the data would be transferred to is identified using the mapping definition. As illustrated in the figure, the example embodiment shows that software queues can be used to receive data from software queue 1 (SQ1), perform some processing on the data, and provide the result to software queue 2 (SQ2). The mapping provides an agreement between the different software queues that it should be expecting a particular data type coming from another software queue. In this way, software queue 1 (SQ1) would know that the data would be provided to a next software queue (not shown) that is based on the need to process the data (e.g. calculate the checksum) in step 340.

Furthermore, in step 340, the consumer could also have defined the first software queue (SQ1) to monitor for a particular type of data. In this case, the block of data being provided will correspond with the particular type of data being monitored for. In other cases, the software queue can be provided the location and size of the block of data stored in another address in memory in which case the first software queue consumer can proceed to retrieve the block of data from the referenced address and determine if the data corresponds to the type it is looking for. If the data corresponds to the correct data type, the first software queue (SQ1) can then be instructed to forward the data to a next software queue for processing. The processing (e.g. checksum calculation) of the data can be performed on one or more software queues in step 345.

Once the block of data reaches the network controller domain, the data that is received within the first shadow ring buffer 1 (Shadow RB1) can then be processed by the consumer of this data. The consumer can instruct the hardware of the network controller to begin processing the data set. The processing involved can be performed using one software queue. Alternatively, the processing can be also performed over many different software queues such that the processing is broken up between the software queues. Consideration on whether to perform the processing in one or more shadow queues can be based on, for example, the complexity of the requested processing to be performed on the data.

As illustrated in the figure, the calculation of checksum on the block of data is being performed by the network controller hardware in step 345. In other embodiments, the calculation of checksum can be performed using more than one software queue in a pipeline formation. In any case, resources are being utilized within the network controller domain to carry out the checksum calculation as opposed to using the resources available within the host domain.

Once the calculation of checksum is completed via the instructions in step 345, the, the processed data can then be moved to the second software queue (SQ2) within the network controller domain in step 350. This second software queue would be assigned the role to provide the output of the checksum calculation back to the host domain. At this time, a notification can also be provided to the requestor that there is data associated with the completed checksum calculation protocol is available to be moved. The software queue moves the response/notification and triggers the interrupt the host CPU in step 360. The interrupt allows the CPU to look at the data corresponding to the output of the checksum calculation and move that data back to the host domain so that the host domain can use that data and perform other onward processing. The data being provided by the second software queue (SQ2) would be provided by the second shadow ring buffer (Shadow RB2) in the network controller domain and received by a second ring buffer (RB2) associated with the host domain. The data, once verified by the consumer of the software queue that it corresponds to the type of data that it is supposed to receive, can then be used by the host domain in step 370.

FIG. 4A and FIG. 4B are tables listing parameters of the generic ring buffer and shadow ring buffers in accordance with various embodiments of the subject technology. The tables represent the data structures that are used to set up and configure the ring buffers for use in the software queues in the host domain (on the PCI) and the shadow ring buffers in the network controller domain (on the network controller). For each ring buffer implemented as part of the software queues in the host domain that are set up and configured based on the parameters listed in FIG. 4A, there is a corresponding ring buffer (e.g. shadow ring buffer) that is also set up and configured on the network controller domain having parameters listed in FIG. 4B.

One feature pertaining to the ring buffers of the present disclosure that is unique because of the freedom from being tied to specific semantics is the ability for the descriptor size to vary. As illustrated in FIG. 4A, the descriptor size can range from 16 bytes to 4$k$ bytes based on the protocol's need. The posted index is updated by the producer and the fetch index is updated by the consumer of the software queue.

The above description thus far has generally described how the implementation of software queues in the host domain and the network controller would look like on a high level. The next figures will go into detail regarding how implementation of the software queue using two general purpose ring buffers would look like, for example, how the ring buffers are arranged in memory (FIG. 5) and the algorithms for scheduling movement of data (FIG. 6A-FIG. 6C).

FIG. 5 is a conceptual block diagram 500 illustrating the process of reading and writing within an example ring buffer in accordance with various embodiments of the subject technology. In particular, the conceptual block diagram 500 is an exemplary layout of the configuration of the registers for the ring buffers at the host. Each of the blocks 510, 520, 530, 540 correspond to a different ring buffer configuration set with a base address in memory. The arrangement is established because the location of each ring buffer needs to be known in order for the host domain to be able to read/write/configure specific registers. Because each ring buffer configuration will take up the same amount of space in memory (as they are all configured using the same parameters from the RIT table illustrated in FIG. 4A), there will be a consistent offset from one starting configuration base address of one ring buffer with respect to the configuration base address to the next ring buffer in memory. Thus one can calculate the configuration base address for each ring buffer in memory based on a starting configuration base address for one ring buffer. This offset (corresponding to the size of the ring buffer configuration description) is referenced as RITSTRIDE in the figure. As illustrated in the figure, if the first ring buffer (RIT #0) 510 has a configuration base address at X=0, the second ring buffer (RIT #1) 520 will start at an address that is offset by the size of the ring buffer information (or 1*RITSTRIDE). Furthermore, the third ring buffer (RIT #2) 530 will be offset from the second ring buffer by the size of the ring buffer information (or twice that from the first ring buffer which corresponds to 2*RITSTRIDE). Such an arrangement is used for the shadow ring buffers as well within the network controller. However, the information about shadow ring buffers need not be exposed to host domain. Therefore, only RIT information is exposed to host on PCI-E following the requirements laid out by PCI-E for exposing the network controller register set.

In connection with the creation of the ring buffers within the host domain, the corresponding set of shadow ring buffers will be created within the network controller domain. The addresses are assigned by the network controller and stored in memory. These addresses for the shadow ring buffer information table are organized in the same way as done for Host domain however, these are not visible to host.

Figure 6A:
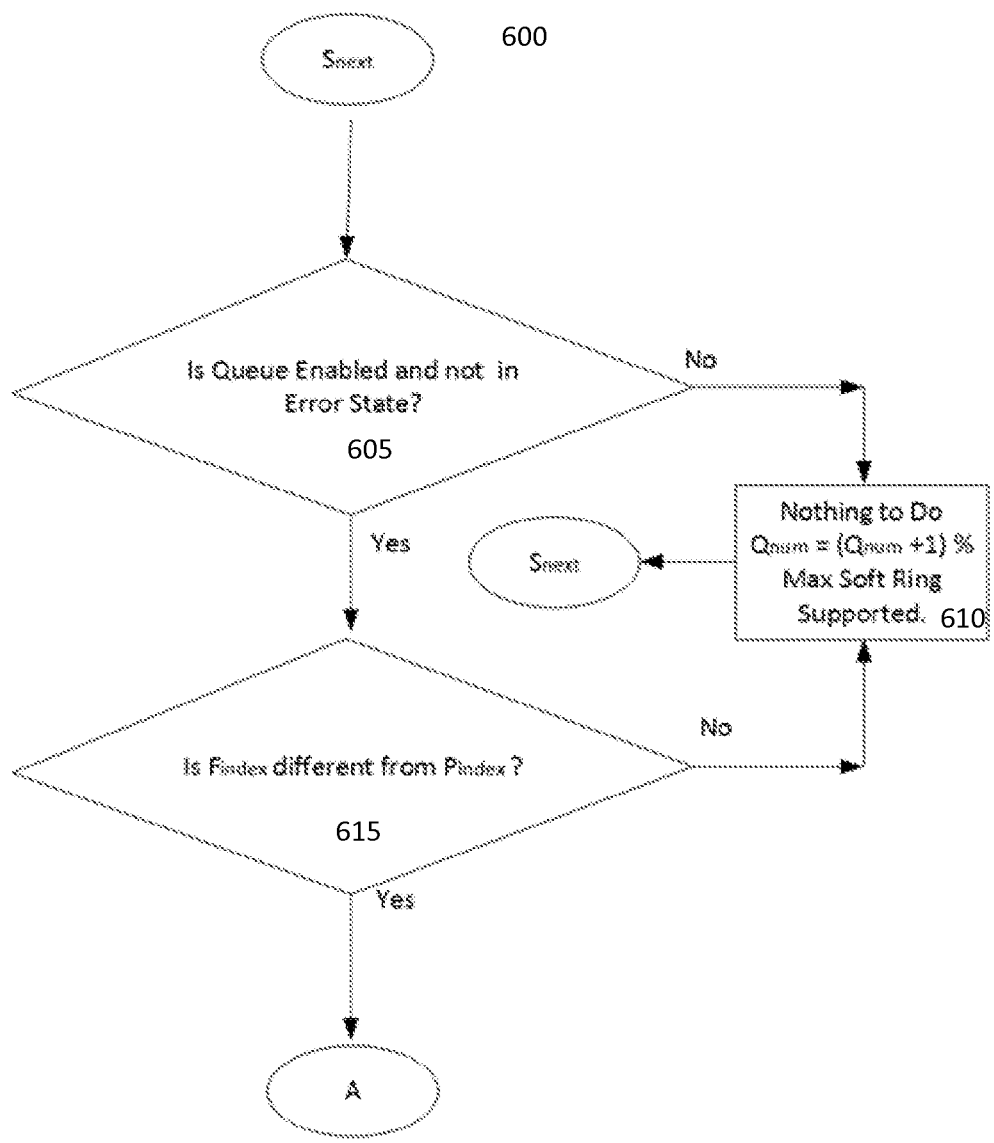
FIG. 6A, FIG. 6B, and FIG. 6C illustrate an example process for implementing general purpose ring buffer handling in the network controller in accordance with various embodiments of the subject technology.
Figure 6B:
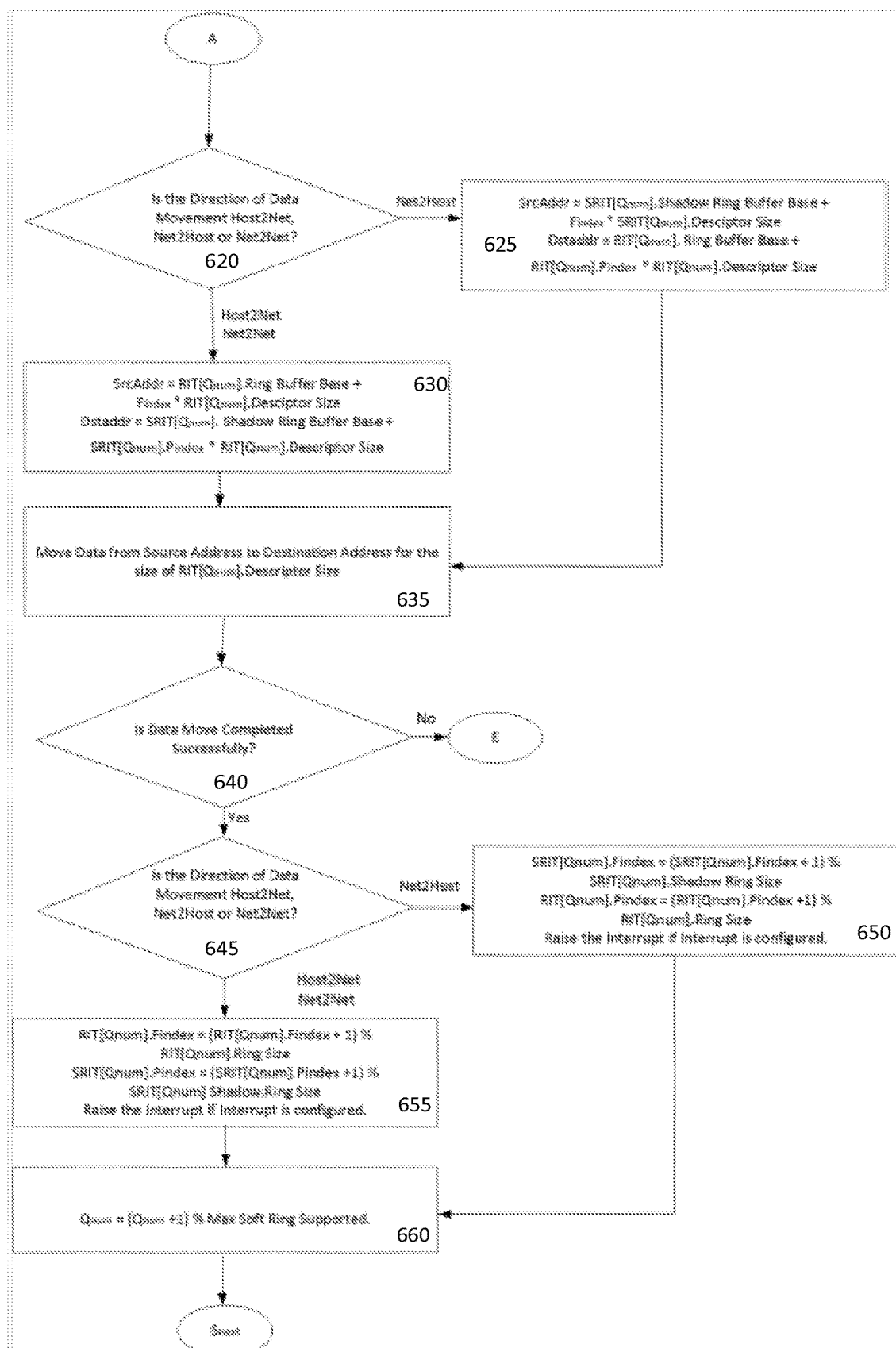
Figure 6C:
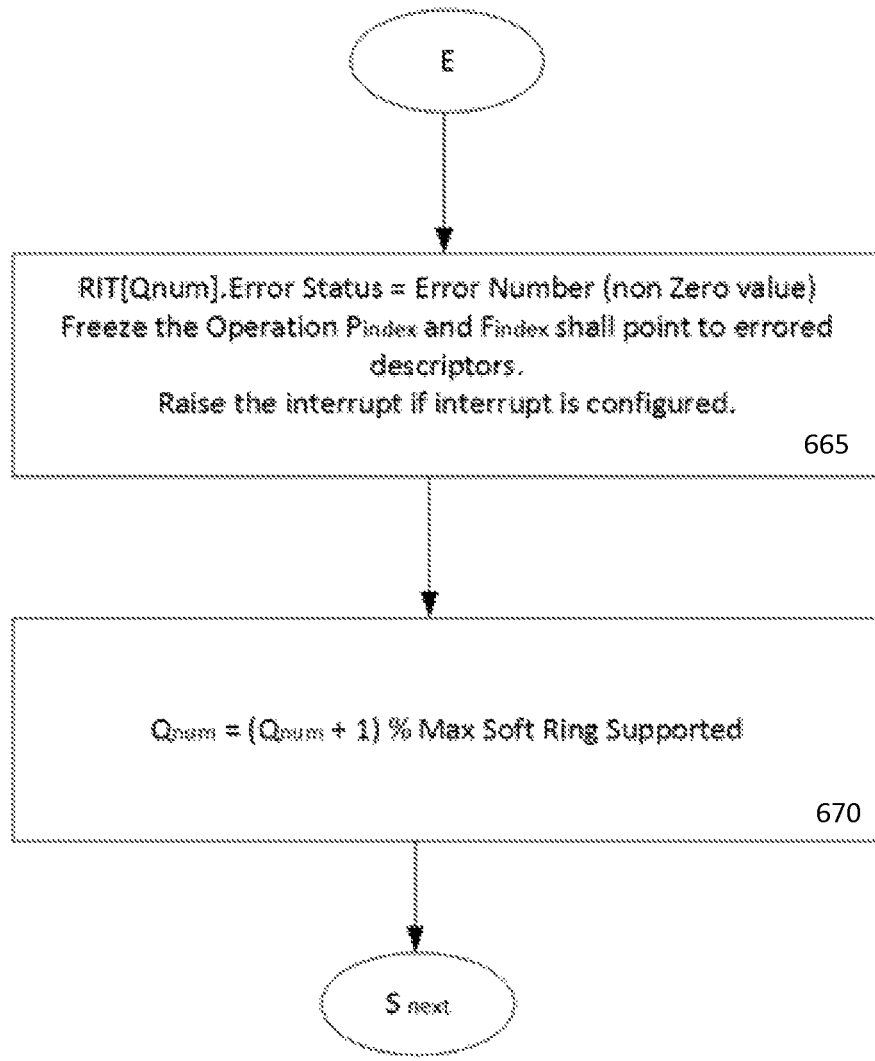

FIG. 6A, FIG. 6B, and FIG. 6C illustrate an example process for implementing general purpose ring buffer handling in a network controller. The figures illustrate branching flow charts that describe what factors are looked at in determining, in a round-robin scheduling manner, whether to schedule a current ring buffer, where the data should be moved to during the scheduling process, and when to move onto the next ring buffer.

With respect to FIG. 6A, the illustration describes the beginning steps for scheduling ring buffers. In step 600, a ring buffer will be selected for scheduling by the network controller. This may start with a first ring buffer and sequentially select following ring buffers once the first ring buffer has been scheduled. As illustrated in FIG. 6A, "scheduling" of a ring buffer comprises first determining whether there is data that needs to be moved.

Each of the Software Queue may be provided a numerical identifier that identifies its position for scheduling (e.g. Qnum #1, Qnum #2, etc. . . . ). The scheduler knows what software queue is being currently evaluated in connection with the ring buffer being evaluated, for example via an internal counter that tracks a current and/or next software queue number for scheduling.

In step 605, the scheduler (e.g. network controller) will then check to see if the current ring buffers of the software queue is enabled and not in error state. If for some reason the software queue is not enabled (e.g. not currently used in an application being executed) or is currently in an error state, the scheduler will do nothing with the current ring buffer, move onto the next software queue (in step 610), and begin scheduling that next software queue. However, if the ring buffer associated with software queue is both enabled and not currently in error, the scheduler will determine if there is data to be moved (in step 615) from within the ring buffer. Specifically, the scheduler will check to see if the fetch index for the ring buffer is different than the posted index. If the fetch index is the same as the posted index, this would mean that there is no data within the ring buffer that would need to be moved. The scheduler will again do nothing with the current software queue and move onto the next software queue for scheduling (in step 610). However, if the fetch index and the posted index are different, this indicates that there is data that needs to be moved.

With respect to FIG. 6B, this covers the evaluation performed surrounding the moving of the data between different ring buffers. Step 620 identifies how the data is being moved between two different ring buffers. Specifically, identification pertains to whether the data is moving from 1) a ring buffer in the network controller to a ring buffer in the host, 2) a ring buffer in the host to a ring buffer in the network controller, or 3) a ring buffer in the network controller to a different ring buffer in the same network controller. Once the determination of the direction of the data being moved is performed, the calculation of where to move the data can be performed (via step 625 or step 630). If the data is moving from the network controller to the host, step 625 is performed. Otherwise, step 630 is performed for data movements going from the host to network controller and data movements internal to the network controller.

In steps 625 and 630, the scheduler first calculates the source address of where the data is located at that needs to be moved. In step 625, since the data is being moved from the network controller to the host, the source address corresponds to the location of the shadow ring buffer (e.g. base address) within the network controller, the fetch index and the size of the data (e.g. descriptor size). The destination address of where the data should be moved to in the host is calculated based on the location of the ring buffer in the host (e.g. base address), the posted index, and the size of the data (e.g. descriptor size). Similarly, if it was determined (in step 620) that the data is being moved from the host to the network controller, the source address is first calculated based on the location of the ring buffer in the host and the destination is calculated based on the location of the shadow ring buffer within the network controller (in step 630). The data size should be consistent/equal between both the ring buffer and the shadow ring buffer.

With the scenario where data is being moved from one ring buffer within the network controller to a different shadow ring buffer within the network controller, a preferred implementation utilizes the source address of the data corresponding to the ring buffer, with the destination corresponding to where the data should be moved to. This implementation is chosen for the scenario when data is moved within the network controller in order to maintain similar programming models (e.g. programming of two base addresses) as used when data moves between the host and the network controller. Therefore, any data movement (whether it be between network and host or network and network) will trigger the writing of the posted index into the appropriate ring configuration registers in accordance with the RIT and SRIT parameters as illustrated in the tables of FIG. 4A and FIG. 4B.

Once the source and destination address have been calculated in step 625 or step 630, the scheduler can then have the data moved accordingly in step 635. The move is assisted by the hardware of the network controller.

After the move is performed, the scheduler will evaluate whether the data was moved successfully in step 640. If the data was not moved successfully, an error state is raised (covered in FIG. 6C) which will halt any future processes related to this current software queue based on a detected error in moving the data. However, if the data is moved successfully, the scheduler, in step 645, will then refer back to determined direction that the data was being moved (via step 620). If the data movement was from network controller to host, the scheduler will perform the incrementing of the fetch index for the shadow ring buffer of the network controller (e.g. where the data was moved from) and the posted index for the ring buffer in the host (where the data was moved to) in step 650. If the data was moving from the host to the network controller (or internally within the network controller), the scheduler will increment the fetch index for the ring buffer in the host or network controller and the posted index for the shadow ring buffer in the network controller in step 655. The incrementing of the fetch index will correspond to where the next data that will be moved should be found in that ring buffer or shadow ring buffer while the incrementing of the post index will correspond to the next location where the data should be moved to during the next time the ring buffer or shadow ring buffer is being scheduled. Furthermore, if an interrupt needs to be raised at this time in either step 650 or step 655 (e.g. when the move of the data is completed), then an interrupt can be provided as configured. As described above, the interrupt may be used to notify the consumer that there is data ready to be processed. The processor can then interrupt pending processes within the network controller so that it can schedule the processing of data for the consumer entity.

After the data move (performed in step 635) has been determined to be successful (in step 640) and the indexes (e.g. posted, fetch) of the ring buffers involved with the data move have been incremented (performed in steps 650 or 655), the next queue number can be identified in step 660 (e.g. counter that tracks current and/or next software queue). The scheduler can then move onto the next software queue for scheduling. Presuming that no error happens, the scheduling will go in a round-robin fashion for all available software queue and move one piece of data from that software queue before moving onto the next software queue.

With reference to FIG. 6C, the figure illustrates the steps performed with respect to the software queue in response to an error state arising from the evaluation that the data move was not performed successfully (during step 640 of FIG. 6B). Specifically, in step 665, the error state for that ring buffer of the software queue will be enabled indicating that an error is present. This corresponds to the 'error status' parameter as illustrated in the RIT and SRIT tables of FIG. 4A and FIG. 4B.

With the presence of the error status, the scheduler will also freeze all operations related to that software queue. The posted index and the fetch index for the corresponding ring buffers will also refer to the errored descriptor indicating that the data was not moved properly. Lastly an interrupt can be raised to provide notification that an error was detected if the ring buffer was configured to do so in the case of an error.

The error state will prevent this particular software queue from being scheduled during future scheduling rounds until recovery is performed (which would remove the error state). Once the error state has been raised, for example, in response to a failed data move, the scheduler can subsequently increment the software queue indicator and move on to scheduling the next software queue (in step 670). The same software queue will be skipped until the error has been resolved and the error state removed from the software queue.

Figure 7A:
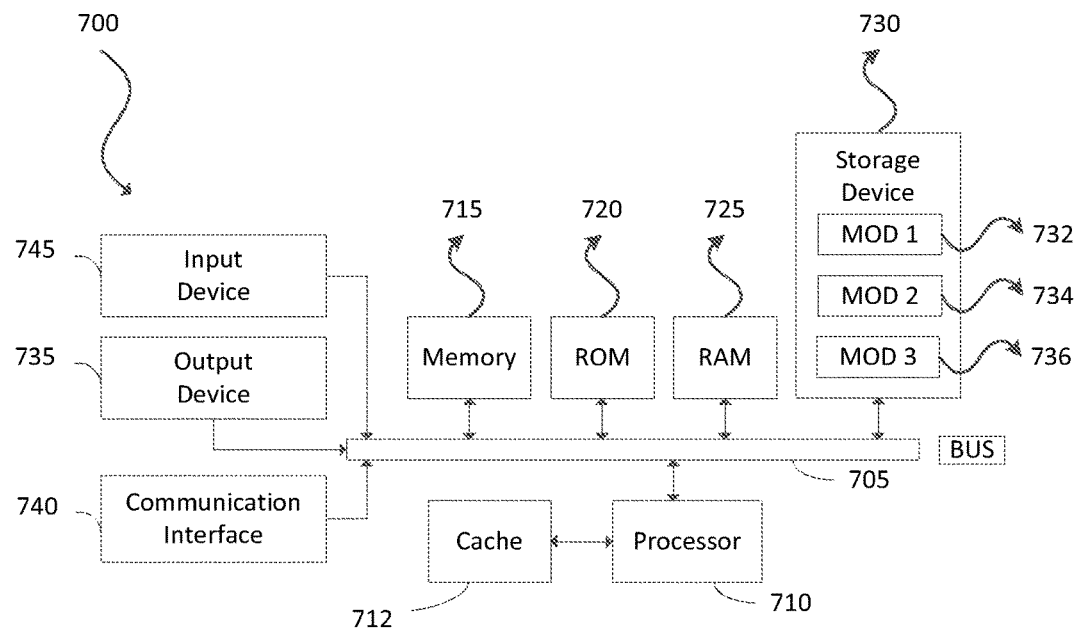
FIG. 7A and FIG. 7B illustrate examples of systems in accordance with some embodiments.
Figure 7B:
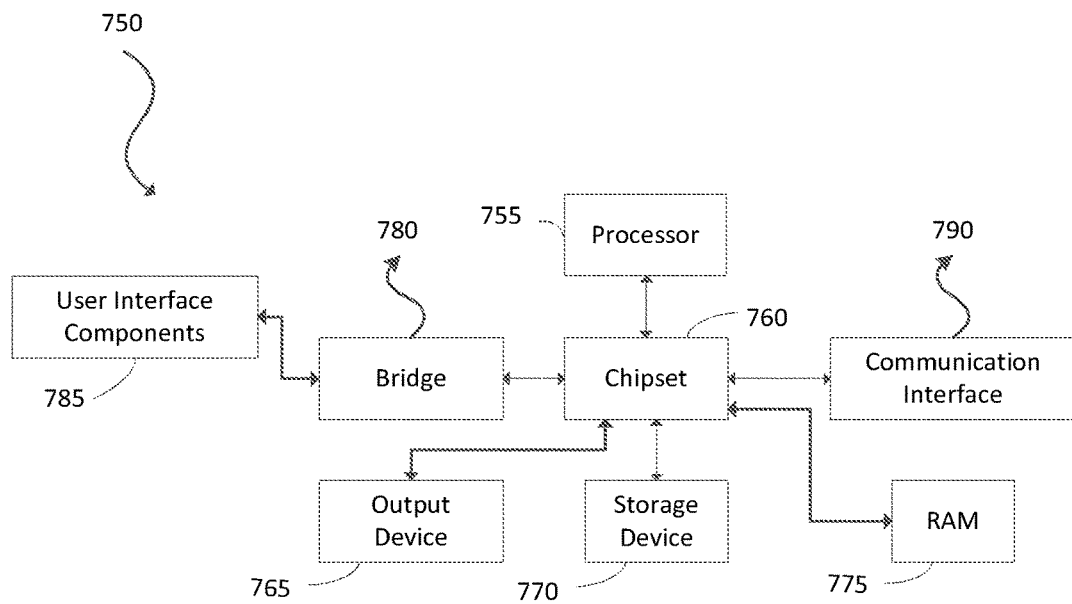

FIG. 7A and FIG. 7B illustrate systems in accordance with various embodiments. For example, the illustrated systems may correspond to the various computing devices within the network illustrated in FIG. 1. The more appropriate system will be apparent to those of ordinary skill in the art when practicing the various embodiments. Persons of ordinary skill in the art will also readily appreciate that other systems are possible.

FIG. 7A illustrates an example architecture for a conventional bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random-access memory (RAM) 725, to the processor 710. The computing system 700 can include a cache 712 of high-speed memory connected directly with, in close proximity to, or integrated as part of the processor 710. The computing system 700 can copy data from the memory 715 and/or the storage device 730 to the cache 712 for quick access by the processor 710. In this way, the cache 712 can provide a performance boost that avoids processor delays while waiting for data. These and other modules can control or be configured to control the processor 710 to perform various actions. Other system memory 715 may be available for use as well. The memory 715 can include multiple different types of memory with different performance characteristics. The processor 710 can include any general-purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, output device 735, and so forth, to carry out the function.

FIG. 7B illustrates an example architecture for a conventional chipset computing system 750 that can be used in accordance with an embodiment. Similar to FIG. 7A, the computing system 750 can correspond to the computing devices in the network illustrated in FIG. 1. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, and solid state media, for example. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 755 analyzing data stored in the storage device 770 or the RAM 775. Further, the computing system 700 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   initiating a plurality of software queues comprising:
   a first ring buffer on a first device, and
   a second ring buffer on a second device, wherein the second ring buffer corresponds to the first ring buffer; and
   executing a protocol using the plurality of software queues, the first ring buffer and the second ring buffer, wherein the protocol comprises a mapping that defines a relationship between the first ring buffer and the second ring buffer, wherein the protocol specifies a type of data defined for the first ring buffer and the second ring buffer, wherein the protocol is executed and completed without interrupting the second device and the second device is only interrupted once the protocol is completed, wherein the protocol defines one or more parameters associated with the second ring buffer, wherein the one or more parameters comprise a descriptor size associated with the second ring buffer, wherein the second ring buffer comprises a shadow ring buffer corresponding to and paired with the first ring buffer.

2. The method of claim 1, wherein the plurality of software queues further comprises a plurality of ring buffers on the first device, wherein the plurality of ring buffers is arranged sequentially, and wherein a base address for each of the plurality of ring buffers is offset by a size of information associated with the plurality of ring buffers.

3. The method of claim 1, wherein the plurality of software queues further comprises a plurality of ring buffers on the second device, wherein a base address for each of the plurality of ring buffers is assigned by the second device and stored in memory after the initiating of the first ring buffer on the first device.

4. The method of claim 1, wherein the protocol further defines how data associated with the data type is to be processed by at least one of the plurality of software queues.

5. The method of claim 4, wherein the execution of the protocol begins when data of the data type is posted to the first ring buffer.

6. The method of claim 1, further comprising scheduling ring buffers in a round-robin fashion.

7. The method of claim 6, further comprising:
   detecting an error for one of the first ring buffer or the second ring buffer during the execution of the protocol; and
   providing an error state for the one of the first ring buffer or the second ring buffer based on the detected error, wherein the error state instructs the one of the first ring buffer or the second ring buffer to be skipped when it is up to be next scheduled.

8. The method of claim 1, wherein the mapping defines whether data should be moved from the first ring buffer to the second ring buffer or from the second ring buffer to the first ring buffer.

9. The method of claim 1, wherein the mapping includes:
   instructions for the first ring buffer and the second ring buffer to request one or more processes to be performed on data posted within the plurality of software queues, and
   an expected output for the data once the processing of the data is completed.

10. A non-transitory computer-readable medium comprising instructions which, when executed by one or more processors, cause the one or more processors to:
    initiate a plurality of software queue, comprising:
    a first ring buffer on a host domain, and
    a second ring buffer on a separate domain, wherein the second ring buffer corresponds to the first ring buffer; and
    execute a protocol using the plurality of software queues, the first ring buffer and the second ring buffer, wherein the protocol comprises a mapping that defines a relationship between the first ring buffer and the second ring buffer, wherein the protocol specifies a type of data defined for the first ring buffer and the second ring buffer, wherein the protocol is executed and completed without interrupting the second device and the second device is only interrupted once the protocol is completed, wherein the protocol defines one or more parameters associated with the second ring buffer, wherein the one or more parameters comprise a descriptor size associated with the second ring buffer, wherein the second ring buffer comprises a shadow ring buffer corresponding to and paired with the first ring buffer.

11. The non-transitory computer-readable medium of claim 10, wherein the plurality of software queues further comprises a plurality of ring buffers on the first device, wherein the plurality of ring buffers is arranged sequentially, and wherein a base address for each of the plurality of ring buffers is offset by a size of information associated with the plurality of ring buffers.

12. The non-transitory computer-readable medium of claim 10, wherein the plurality of software queues further comprises a plurality of ring buffers on the second device, wherein a base address for each of the plurality of ring buffers is assigned by the second device and stored in memory after the initiating of the first ring buffer on the first device.

13. The non-transitory computer-readable medium of claim 10, wherein the protocol further defines how data associated with the data type is to be processed by at least one of the plurality of software queues.

14. The non-transitory computer-readable medium of claim 13, wherein the instructions, when executed by the one or more processors, further cause the one or more processors to:
    detect an error for one of the first ring buffer or the second ring buffer during the execution of the protocol; and
    provides an error state for the one of the first ring buffer or the second ring buffer based on the detected error, wherein the error state instructs the one of the first ring buffer or the second ring buffer to be skipped when it is up to be next scheduled.

15. A system comprising:
    a processor; and
    a non-transitory computer-readable medium storing instructions that, when executed by the processor, cause the system to:
    initiate a plurality of software queue, comprising:
    a first ring buffer on a host domain, and
    a second ring buffer on a separate domain, wherein the second ring buffer corresponds to the first ring buffer; and
    execute a protocol using the plurality of software queues, the first ring buffer and the second ring buffer, wherein the protocol comprises a mapping that defines a relationship between the first ring buffer and the second ring buffer, wherein the protocol specifies a type of data defined for the first ring buffer and the second ring buffer, wherein the protocol is executed and completed without interrupting the second device and the second device is only interrupted once the protocol is completed, wherein the protocol defines one or more parameters associated with the second ring buffer, wherein the one or more parameters comprise a descriptor size associated with the second ring buffer, wherein the second ring buffer comprises a shadow ring buffer corresponding to and paired with the first ring buffer.

16. The system of claim 15, wherein the plurality of software queues further comprises a plurality of ring buffers on the first device, wherein the plurality of ring buffers is arranged sequentially, and wherein a base address for each of the plurality of ring buffers is offset by a size of information associated with the plurality of ring buffers.

17. The system of claim 16, wherein the protocol further defines how data associated with the data type is to be processed by at least one of the plurality of software queues.

18. The system of claim 17, wherein the instructions, when executed by the processor, further cause the system to:
   detect an error for one of the first ring buffer or the second ring buffer during the execution of the protocol; and
   provide an error state for the one of the first ring buffer or the second ring buffer based on the detected error, wherein the error state instructs the one of the first ring buffer or the second ring buffer to be skipped when it is up to be next scheduled.

19. The system of claim 15, wherein the plurality of software queues further comprises a plurality of ring buffers on the second device, wherein a base address for each of the plurality of ring buffers is assigned by the second device and stored in memory after the initiating of the first ring buffer on the first device.

* * * * *